United States Patent
Pantzar

(10) Patent No.: US 7,845,256 B2
(45) Date of Patent: Dec. 7, 2010

(54) CUTTING TOOL AND A TOOL PART WITH CONNECTING SURFACES WITH GROOVES AND A METHOD FOR MANUFACTURING OF THE TOOL PART

(75) Inventor: Göran Pantzar, Årsunda (SE)

(73) Assignee: Sandvik Intellectual Property AB, Sandviken (SE)

( * ) Notice: Subject to any disclaimer, the term of this patent is extended or adjusted under 35 U.S.C. 154(b) by 455 days.

(21) Appl. No.: 10/587,749

(22) PCT Filed: Jan. 28, 2005

(86) PCT No.: PCT/SE2005/000104

§ 371 (c)(1),
(2), (4) Date: Apr. 26, 2007

(87) PCT Pub. No.: WO2005/072898

PCT Pub. Date: Aug. 11, 2005

(65) Prior Publication Data

US 2007/0274791 A1      Nov. 29, 2007

(30) Foreign Application Priority Data

Jan. 30, 2004   (SE) .................................. 0400183

(51) Int. Cl.
*B23C 5/22*   (2006.01)
*B23B 27/16*  (2006.01)
(52) U.S. Cl. ..................... 82/1.11; 407/67; 407/113
(58) Field of Classification Search ......... 407/113–116, 407/30, 33, 34, 66, 67, 69, 70; 411/411; 82/1.11
See application file for complete search history.

(56) References Cited

U.S. PATENT DOCUMENTS

| 2,240,360 | A |   | 4/1941  | Whitman |
| 3,108,623 | A | * | 10/1963 | Muenchinger ............... 81/460 |
| 3,175,850 | A | * | 3/1965  | Steczynski .................. 285/333 |
| 4,545,705 | A |   | 10/1985 | Benson |

(Continued)

FOREIGN PATENT DOCUMENTS

DE        34 48 086 C2    8/1985

(Continued)

OTHER PUBLICATIONS

Balasubramaniam et al., An Anti Backlash Two-Part Shaft Coupling with Interlocking Elastically Averaged Teeth, pp. 1-28 [Online]. MIT undated [retrieved on Oct. 2, 2006]. Retrieved from the Internet: <URL:http//pergatory.mit.edu/kinematiccouplings/documents/Papers/elastic_averaging.pdf#search=%22curvic%20coupling%20insert%22>.

*Primary Examiner*—Will Fridie, Jr.
(74) *Attorney, Agent, or Firm*—Drinker Biddle & Reath LLP

(57) ABSTRACT

A cutting tool of the type that comprises two parts having co-operating connecting surfaces of serration type, which individually include a plurality of ridges or tops, which are mutually separated by grooves, the pitch between the ridges in the respective connecting surfaces being one and the same. According to the invention, the widths of two or more grooves positioned one after the other in a series in one of the connecting surfaces increase progressively from a first groove to a last groove in the series. Furthermore, the invention relates to a tool part as such, as well as a method in the manufacture of such tool parts.

21 Claims, 3 Drawing Sheets

U.S. PATENT DOCUMENTS

Figures 1, 2:
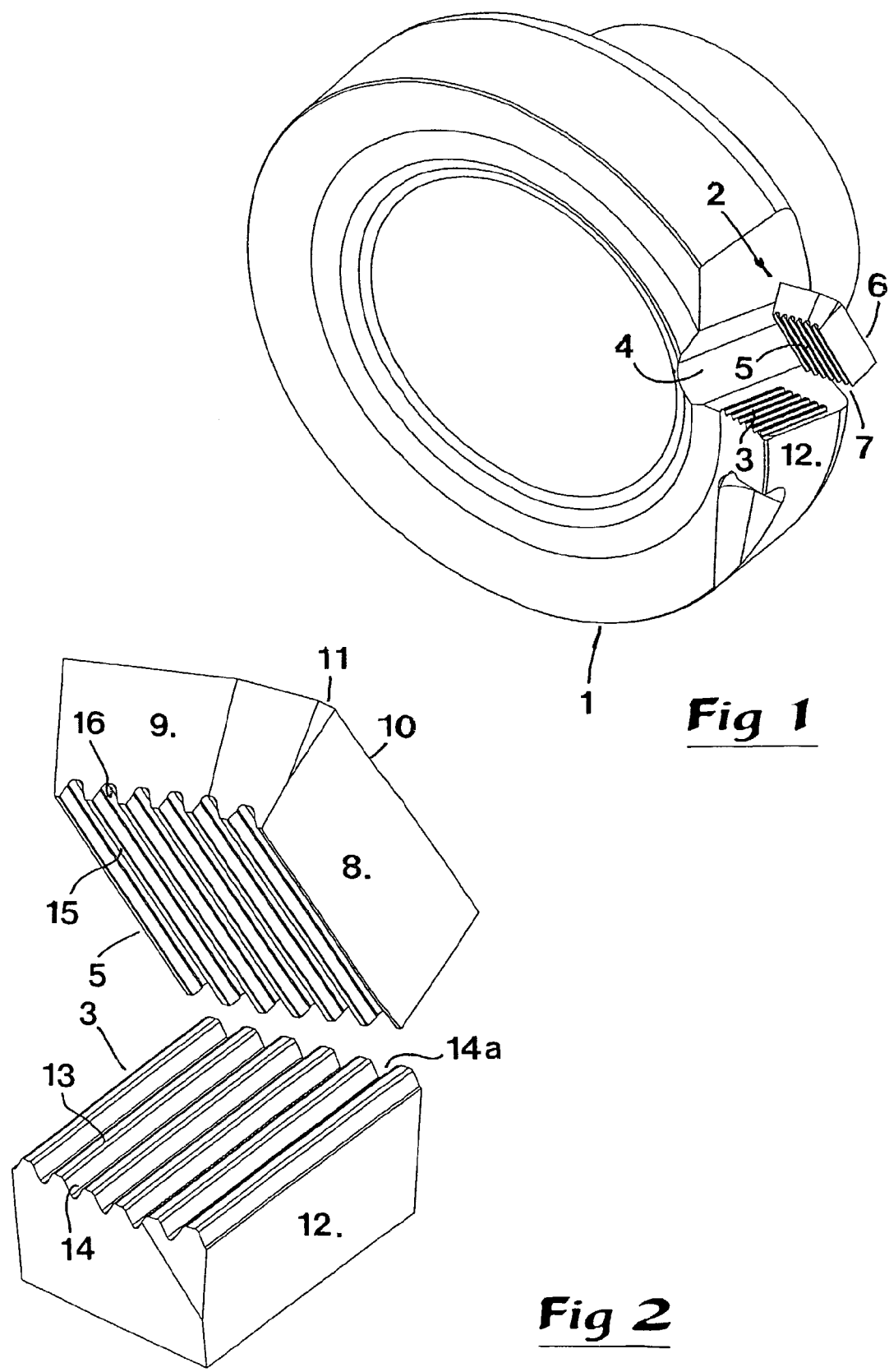

| | | |
|---|---|---|
| 4,749,667 A | 6/1988 | Jun et al. |
| 5,525,016 A * | 6/1996 | Paya et al. ............... 407/116 |
| 5,810,518 A | 9/1998 | Wiman et al. |
| 5,924,826 A | 7/1999 | Byström et al. |
| 5,931,613 A | 8/1999 | Larsson |
| 5,970,613 A * | 10/1999 | Mori et al. ............... 29/888.43 |
| 6,146,060 A | 11/2000 | Rydberg et al. |
| 6,146,061 A | 11/2000 | Larsson |
| 6,524,034 B2 * | 2/2003 | Eng et al. ............... 408/59 |
| 6,626,614 B2 | 9/2003 | Nakamura |
| 6,736,574 B2 * | 5/2004 | Persson et al. ............... 407/77 |
| 6,948,889 B2 * | 9/2005 | Arvidsson ............... 407/35 |
| 7,001,114 B2 | 2/2006 | Blücher et al. |
| 7,021,871 B2 | 4/2006 | Arvidsson et al. |
| 7,101,122 B2 | 9/2006 | Horiike et al. |
| 7,597,510 B2 * | 10/2009 | Lundvall ............... 407/113 |
| 2004/0180776 A1 | 9/2004 | Brandt |
| 2007/0009334 A1 | 1/2007 | Edler |

FOREIGN PATENT DOCUMENTS

| | | |
|---|---|---|
| DE | 42 44 316 A1 | 6/1994 |
| EP | 1 325 785 | 7/2003 |
| EP | 1 415 742 A1 | 5/2004 |
| WO | 02/072300 | 9/2002 |
| WO | WO 03/092934 A1 | 11/2003 |
| WO | WO 2007/001224 A1 | 1/2007 |

* cited by examiner

CUTTING TOOL AND A TOOL PART WITH CONNECTING SURFACES WITH GROOVES AND A METHOD FOR MANUFACTURING OF THE TOOL PART

TECHNICAL FIELD OF THE INVENTION

This invention relates to a cutting tool of the type that comprises two parts having co-operating connecting surfaces of serration type, which individually include a plurality of ridges or tops, which are mutually separated by grooves, the pitch between the ridges in the respective connecting surfaces being one and the same.

BACKGROUND OF THE INVENTION

Tools of the above-mentioned type, which are intended for chip-removing machining of foremost workpieces of metal, are usually composed of a carrying or holding basic body, e.g. a cutter head, a drill shank, a turning bar or the like, as well as one or more replaceable cutting inserts, which are mounted in so-called insert seats in the basic body. Most commonly, said insert seat is formed in the basic body itself, but in certain cases it may also be included in a particular shim plate, which in turn is fixed in relation to the basic body. The cutting inserts may have a most varying shape and be indexable in order to enable use of two or more cutting edges included in the cutting insert. Quadrangular or polygonally shaped cutting inserts have at least three or four side support or clearance surfaces, which extend between mutually parallel top and bottom sides of the cutting insert. While the cutting inserts are manufactured from a particularly hard and wear-resistant material, such as moulded and sintered cemented carbide, the basic body is manufactured from a more elastic material, in particular steel.

In order to attain good machining results in respect of precision and surface smoothness of the machined workpiece, it is of great importance that the active edge of the cutting insert gets an exact, predetermined position in relation to the basic body. In many applications, the requirements on dimensional accuracy in respect of the position of the cutting edge in relation to the basic body approaches rather 0.001 mm than 0.01 mm.

Another trend in the development in the technology in question is that cemented carbide inserts already in connection with compression moulding and sintering gets a better and better dimensional accuracy. In order to obtain good precision of the cutting inserts, it was previously necessary to subject the cutting inserts to expensive grinding operations, but by means of improved compression moulding and sintering technique it has, for economical reasons, become more and more interesting to try to get away from the need for precision grinding. However, it is inevitable that today's directly pressed, i.e., not ground cutting inserts, have a dimensional variation of the order of (±)0.5% of the nominal measure of length of the cutting insert. When the cutting inserts are formed with serration connecting surfaces of the type initially mentioned, such dimensional variations result in the position of the cutting insert and thereby of the cutting edge in relation to the insert seat in the basic body being impossible to predetermine in a satisfactory way. In certain cases when the result from the manufacture is good, the cutting edge may end up in the desired position, but when the result is inferior, the position of the cutting edge in relation to the insert seat may deviate to such an extent from the desired position, that the machining precision becomes less good.

In this connection, it should be pointed out that the precision of the ridges in the serration connecting surface forming the insert seat of the basic body always have a good precision, because said connecting surface is produced by chip-removing precision machining, in particular milling, and not by compression moulding/sintering.

Before the introduction of cutting tools having serration connecting surfaces in the interface between the cutting insert and the basic body, the exact position of the active cutting edge was determined by the distance between the edge and the clearance surface positioned on the opposite side of the cutting insert, which clearance surface was pressed against a co-operating support surface in the insert seat. In this case—when said clearance surface formed a reference point that determined the position of the edge—the position precision of the edge could become catastrophically poor if the cutting insert was not ground, because the distance between the active edge and the opposite clearance surface is—in the context—considerable, in particular on large cutting inserts. After the introduction of serration connecting surfaces as means of fixation of the cutting inserts, it has been possible to double the position precision (=the tolerance is halved) of the cutting edge, more precisely by the fact that an intermediate ridge in the serration connecting surface of the cutting insert is selected as reference point for the position of the cutting edge. By the fact that said intermediate ridge is halfway between opposite sides/cutting edges on the cutting insert, the distance is accordingly halved between the active cutting edge and the position-determining reference point, thereby ensuring halving of the tolerance errors. However, also this position precision is unsatisfactory in many of the applications that demand better and better machining results.

OBJECTS AND FEATURES OF THE INVENTION

The present invention aims at obviating the above-mentioned drawbacks of previously known cutting tools of the type initially mentioned, and at providing an improved cutting tool. Thus, a primary object of the invention is to provide a cutting tool that enables use of directly pressed, i.e., ungrounded cemented carbide inserts, while guaranteeing good position precision of the active cutting edge on the mounted cutting insert. An additional object is to provide a cutting tool that enables the attainment of good precision without any cost-demanding machining operations at all in connection with the manufacture.

According to the invention, the above-mentioned objects are attained by the widths of two or more grooves positioned one after the other in a series in which one of the connecting surfaces increase progressively from a first groove to a last groove in the series.

In a second aspect, the invention also relates to a part intended for cutting tools of the type that includes a serration connecting surface serving as insert seat. Said tool part may consist of a basic body, a shim plate or the like. The features of the tool part according to the invention are that an insert seat in the form of a serration connecting surface intended for receipt of a cutting insert, which surface includes a plurality of ridges, which are mutually separated by grooves, and have a given pitch, wherein the widths of two or more grooves positioned one after the other in a series increase progressively from a first groove to a last groove in the series, with unchanged pitch between the ridges.

In a third aspect, the invention also relates to a method in the manufacture of tool parts of the kind in question. The features of the method according to the invention are that the part manufactured intended for cutting tools and of the type that comprises an insert set intended for receipt of a cutting insert and being in the form of a serration connecting surface, which comprises a plurality of ridges or tops that are mutually separated by grooves, the pitch between the ridges being given, wherein the connecting surface is formed so that the widths of two or more grooves positioned one after the other in a series increase progressively from a first groove to a last groove in the series, without the given pitch between the ridges being changed.

SUMMARY OF THE INVENTION

The invention is based on the idea to form a serration connecting surface serving as insert seat in such a way that the widths of two or more grooves, one after the other in a series, increase progressively from a first groove to a last one in the series, while the predetermined pitch between the grooves is preserved. Usually, this pitch is regular, so far that the centre distances between all grooves in the connecting surface are equally large. However, the pitch may also be irregular, for instance as a consequence of one or more ridges in the connecting surface, e.g., an intermediate ridge, being wider than other ridges.

BRIEF DESCRIPTION OF THE APPENDED DRAWINGS

Figure 3:
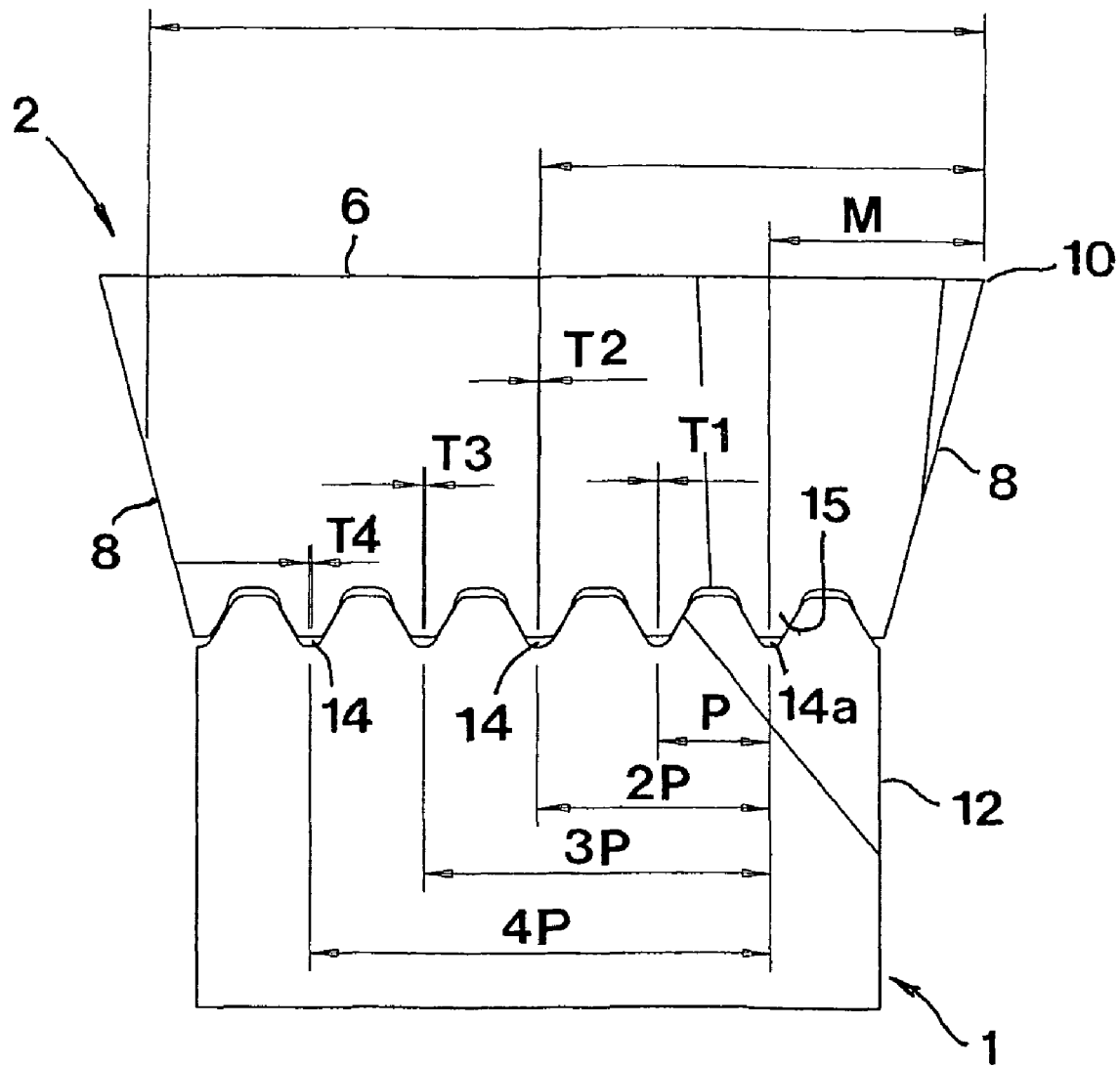
Figure 4:
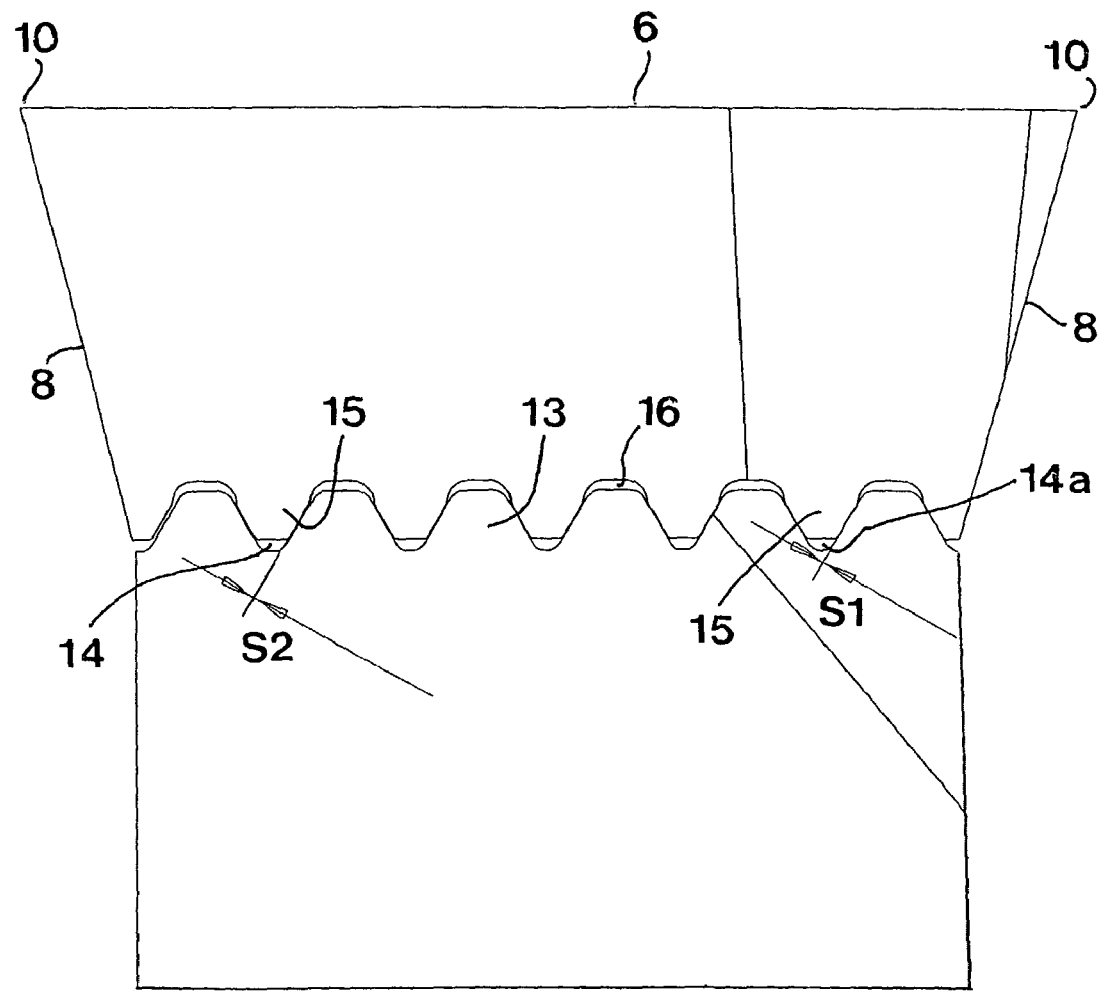

In the drawings:

FIG. 1 is a simplified perspective view of a cutting tool exemplified in the form of a milling cutter, which is visualised with an insert seat having a released cutting insert associated thereto, FIG. 2 is a perspective exploded view showing the same cutting insert and insert seat on an enlarged scale, FIG. 3 is a cross-section through the cutting insert and the insert seat in an assembled state, and FIG. 4 is an additionally enlarged section of the same cutting insert and insert seat.

DETAILED DESCRIPTION OF A PREFERRED EMBODIMENT OF THE INVENTION

In FIG. 1, a rotatable cutting tool is shown embodied as a milling cutter, which includes a basic body 1 in the form of a cutter head, as well as a number of cutting inserts 2. For the sake of simplicity, only one such cutting insert is shown, although in practice milling cutters are equipped with a plurality of peripherical and tangentially spaced cutting inserts. The individual cutting insert is mounted in an insert seat designated 3, which is formed adjacent to a chip pocket 4 in the periphery of the basic body 1. The insert seat 3 consists of a first connecting surface of serration type, which is arranged to co-operate with a second serration connecting surface 5, which is formed on the bottom side of the cutting insert 2. In practice, the cutting insert is fixed by means of a suitable clamping member, e.g., a screw or a clamp. What type of clamping member that is used in order to fix the cutting insert in the insert seat is, however, incidental for the understanding of the invention, and therefore the same has been omitted from the drawing.

Before the two serration connecting surfaces 3, 5 is described in detail, the general shape of the cutting insert 2 should be described briefly. In the chosen example, the cutting insert has a flat and quadrangular (rectangular) basic shape, which is determined by generally planar and mutually parallel top and bottom sides 6 and 7. Between these surfaces, four side surfaces 8, 9 extend, at least a pair of opposite ones of which, namely the surfaces 8, form clearance surfaces. These surfaces 8 are longer than the side surfaces 9 at the two opposite short ends of the cutting insert. Between the top side of the cutting insert and each side surface 8, there is a major cutting edge 10 and one or more minor cutting edges 11. In the example, the cutting insert is indexable in two positions. In one of these positions, the cutting edge 10, visible in FIG. 2, is indexed forward to an active state, in which it is situated in the area of the external surface of the basic body, which in FIGS. 1 and 2 is designated 12.

Each one of the two connecting surfaces 3 and 5 comprises, in a conventional way, a number of ridges, which are mutually separated by grooves. The number of ridges in each connecting surface may vary most considerably. However, in the example according to FIGS. 1 and 2, the connecting surface 3 is shown with six ridges 13, which are separated by five grooves 14. The connecting surface 5 includes seven ridges 15, which mutually are separated by six grooves 16. Of the ridges 15, the two outermost ones adjacent to the clearance surfaces 8 are substantially cut in half, while the other five have a full cross-section profile.

In FIG. 3 and FIG. 4 it is seen how the individual groove in each one of the two co-operating connecting surfaces is delimited by two opposite flank surfaces or flanks (lack reference designations) on the two ridges, which surround the individual groove. These flanks on each individual ridge diverge in the direction from the crest of the ridge and usually form an angle of 60° to each other, although also other angles are feasible. The essential thing is that the crests of the ridges in one of the connecting surface do not bottom in the grooves in the other connecting surface. It is also essential that the pitch between the ridges is the same in the two connecting surfaces, because otherwise it would not be possible to fit in one of the connecting surfaces into the other.

It deserves once again to be pointed out that the basic body 1 is made from steel or the like, and that the connecting surface 3 is made by precision machining, e.g., milling, of the ridges and the grooves 13, 14. However, the cutting insert 2 is produced by compression moulding and sintering of cemented carbide, the connecting surface 5 thereby getting the final shape thereof. In other words, the cutting insert is directly pressed, so far that the same is not subjected to any precision grinding after sintering. This means in turn that the dimensional variations of individual cutting inserts—depending on the production result—may amount to the order of 0.5% (+/−) of the measure of length.

As far as the shown tool has been described hitherto, the same is in all essentials previously known.

In FIGS. 2-4, 14a designates the groove, included in the connecting surface 3, that is situated closest to the free surface 12 of the basic body, which forms the outer limiting edge of the insert seat. This groove 14a forms a first groove in a series of grooves, which in addition to the first groove includes four additional grooves (all designated just 14). The pitch between two nearby grooves is designated P. Thus, the distance between the first groove and the second groove in the series amounts to P mm. The distance between the first and the third groove amounts to 2×P, while the distance between the first and the fourth and fifth grooves amounts to 3P and 4P, respectively. In the example, where the cutting insert is indexable into two different positions, the pitch is uniform, so far that the pitch between the grooves in the connecting surface 3 is one and the same, and corresponds with the pitch between the ridges (and also the grooves) in the connecting surface 5 of the cutting insert. In previously known serration connections, all grooves in the series of grooves in the connecting surface 3 serving as insert seat have had one and the same width.

However, characteristic of the present invention is in general that the different grooves in the series of grooves 14, 14a, which is included in the connecting surface 3, do not have one and the same width. More precisely, the widths of the grooves 14 increase progressively from the first (right) groove 14a to the last (left) groove 14 in the same series. This progressive width enlargement of the grooves 14 following the first groove 14a is determined by the distance of the individual groove from the first groove. More precisely, the width enlargement may advantageously amount to approx. 0.5% (=the expected dimensional variation of individual cutting inserts) of the distance of the individual groove 14 from the first groove 14a in the series.

Suppose that the pitch P between the grooves in the connecting surface 3 amounts to 2.00 mm in absolute numbers, and that the first groove 14a in the series of grooves has a given width, the size of which in absolute numbers is incidental, depending on how the width is measured (one way to measure the width is to determine the distance between imaginary lines halfway between outer and inner limiting lines of the two flank surfaces adjacent to the individual groove). Thus, according to the invention, the second groove 14 in the series, which is situated at the distance P from the first groove, is formed with a width that is 0.5×2.0/100=0.01 mm larger than the width of the first groove 14a. In FIG. 3, this width increment is designated T1. The next groove 14, which is situated at the distance 2P from the first groove 14a, is given a width increment T2 of 2×0.5×2.00/100=0.02 mm. The groove following after this, which is situated at the distance 3P from the groove 14a, is given a width increment T3 of 3×0.5×2.00/100=0.03 mm, and the last groove in the series is given a width increment T4 of 4×0.5×2.00/100=0.04 mm. In other words, the widths of the grooves increase progressively in the direction from the first (right) groove to the last (left) groove in the same series.

Because the first groove 14a in the series of grooves, which is included in the connecting surface 3 that forms the insert seat of the tool, is situated closest to the external surface 12 of the basic body, only the first groove 14a will be located closest to the outer active cutting edge 10 of the cutting insert. More precisely, the distance between the groove 14a and the cutting edge 10 is determined by the measure M. When the cutting insert is applied in the insert seat, the cutting insert may, per se, to a certain extent tip around the fulcrum or centre of rotation that is formed by the ridge 15 that engages the groove 14a; all depending on the properties of the individual cutting insert in respect of unforeseeable dimensional variations of the ridges in the connecting surface 5. In some cases, the top side of the cutting insert may be located exactly parallel to the insert seat, but in some cases a certain inclination may arise. However, such an inclination will in all essentials be negligible because the same will amount to max 0.5°.

In FIG. 4, S1 designates a theoretical play of 0.003 mm between a groove 14a and the corresponding ridge 15 in the connecting surface 5. The corresponding play S2 between a ridge 15 and the last groove 14 located farthest to the left may then amount to 0.0138, i.e., be approximately 4 to 5 times larger than the play S1.

Although the preferred, progressive width enlargement advantageously amounts to 0.5%, as has been described above, the same may be chosen not only less than, but also larger than 0.5%. However, the width enlargement should amount to at least 0.2%. On the other hand, it should not exceed 1.5%.

A substantial advantage of the invention is that the position of the cutting edge in relation to the basic body in all essentials is determined by the moderate distance (M) between the cutting edge and the first groove in the series of grooves, which is formed on the bottom side of the cutting insert. In this limited part of the cutting insert, the risk of tolerance errors is very moderate, not to say negligible. Such tolerance errors (max 0.5% of the measure of length), which arise in the serration connecting surface of the cutting insert starting from the second ridge in the series of ridges, do not affect the space geometrical position of the cutting edge, because the form errors are absorbed by the successively wider and wider grooves in the serration connecting surface that forms the insert seat. This utmost desirable effect is attained by means of the simple measure to modify the geometry of the cutting tool that forms the insert seat, more precisely in such a way that the grooves become progressively wider and wider instead of being made equally wide. In other words, no cost-demanding, extraordinary machining operations are required at all in order to achieve the desired result.

Feasible Modifications of the Invention

Although the connecting surface formed with progressively increasing groove widths in the example is shown made in the basic body (the cutter head) of the tool, it is of course also feasible to form the connecting surface in a shim plate or another part with the purpose of co-operating with a directly pressed cutting insert. In the example shown in the drawings, the ridges in each one of the two connecting surfaces are elongate and extend unbroken between opposite ends. Nevertheless, the invention is applicable also to such connections that include a waffle-patterned or chequered connecting surface, i.e., a connecting surface that includes a plurality of pyramidal tops located in rows one after the other. Thus, also the grooves between the rows may be formed with progressively increasing widths from a first groove to a last in a series.

LIST OF REFERENCE DESIGNATIONS

1=basic body
2=cutting insert
3=serration connecting surface (insert seat)
4=chip pocket
5=serration connecting surface (on cutting insert)
6=top side of cutting insert
7=bottom side of cutting insert
8=side surface of cutting insert
9=side surface of cutting insert
10=major cutting edge on cutting insert
11=minor cutting edge
12=outside on basic body
13=ridges (in insert seat)
14=grooves (in insert seat)
15=ridges (on cutting insert)
16=grooves (in cutting insert)

The invention claimed is:

1. Cutting tool, comprising two parts having cooperating connecting surfaces of serration type, which individually comprises a plurality of ridges or tops, which are mutually separated by grooves, the pitch between the ridges in the respective connecting surfaces being one and the same, wherein the widths of two or more grooves positioned one after the other in a series in one of the connecting surfaces increase progressively from a first groove to a last groove in the series, and wherein the depth of said two or more grooves is the same.

2. Part of a cutting tool, comprising an insert seat in the form of a serration connecting surface intended for receipt of a cutting insert, which surface includes a plurality of ridges, which are mutually separated by grooves, and have a given pitch, wherein the widths of two or more grooves positioned one after the other in a series increase progressively from a first groove to a last groove in the series, with unchanged pitch between the ridges, and wherein the depth of said two or more grooves is the same.

3. Tool part according to claim 2, wherein the progressive width enlargement of the grooves in said series following after a first groove is determined by the distance of the individual groove from the first groove.

4. Tool part according to claim 3, wherein the width enlargement amounts to at least 0.2% of the distance of the individual groove from said first groove.

5. Tool part according to claim 2, wherein the width enlargement amounts to at most 1.5% of the distance of the individual groove from said first groove.

6. Tool part according to claim 2, wherein said first groove in the series of grooves is located closest to a free edge along the insert seat in order to in the same locate a ridge positioned closest to an active cutting edge on the cutting insert, when the cutting insert is applied in the insert seat.

7. Method in the manufacture of a part intended for cutting tools and of the type that comprises an insert seat intended for receipt of a cutting insert and being in the form of a serration connecting surface, which comprises a plurality of ridges or tops that are mutually separated by grooves, the pitch between the ridges being given, wherein the connecting surface is formed so that the widths of two or more grooves positioned one after the other in a series increase progressively from a first groove to a last groove in the series, without the given pitch between the ridges being changed, and wherein the depth of said two or more grooves is the same.

8. Method according to claim 7, wherein the progressive width enlargement of the grooves in said series following after a first groove is determined by the distance of the individual groove from the first groove.

9. Method according to claim 8, wherein the width enlargement amounts to at least 0.2% of the distance of the individual groove from said first groove.

10. Method according to claim 9, wherein the width enlargement amounts to at most 1.5% of the distance of the individual groove from said first groove.

11. Method according to claim 7, wherein the width enlargement amounts to at most 1.5% of the distance of the individual groove from said first groove.

12. Method according to claim 7, wherein said first groove in the series of grooves is located closest to a free edge along the insert seat in order to in the same locate a ridge positioned closest to an active cutting edge on the cutting insert, when the cutting insert is applied in the insert seat.

13. Tool part according to claim 4, wherein the width enlargement amounts to at most 1.5% of the distance of the individual groove from said first groove.

14. Cutting tool according to claim 1, wherein the progressive width enlargement of the grooves in said series following after a first groove is determined by the distance of the individual groove from the first groove.

15. Cutting tool according to claim 14, wherein the width enlargement amounts to at least 0.2% of the distance of the individual groove from said first groove.

16. Cutting tool according to claim 15, wherein the width enlargement amounts to at most 1.5% of the distance of the individual groove from said first groove.

17. Cutting tool according to claim 1, wherein the width enlargement amounts to at most 1.5% of the distance of the individual groove from said first groove.

18. Cutting tool according to claim 1, wherein said first groove in the series of grooves is located closest to a free edge along the insert seat in order to in the same locate a ridge positioned closest to an active cutting edge on the cutting insert, when the cutting insert is applied in the insert seat.

19. Cutting tool, comprising two parts having cooperating connecting surfaces of serration type, which individually comprises a plurality of ridges or tops, which are mutually separated by grooves, the pitch between the ridges in the respective connecting surfaces being one and the same, wherein the widths of two or more grooves positioned one after the other in a series in one of the connecting surfaces increase progressively from a first groove to a last groove in the series, and wherein the ridges and grooves are straight and parallel, and wherein the depth of said two or more grooves is the same.

20. Part of a cutting tool, comprising an insert seat in the form of a serration connecting surface intended for receipt of a cutting insert, which surface includes a plurality of ridges, which are mutually separated by grooves, and have a given pitch, wherein the widths of two or more grooves positioned one after the other in a series increase progressively from a first groove to a last groove in the series, with unchanged pitch between the ridges, and wherein the ridges and grooves are straight and parallel, and wherein the depth of said two or more grooves is the same.

21. Method in the manufacture of a part intended for cutting tools and of the type that comprises an insert seat intended for receipt of a cutting insert and being in the form of a serration connecting surface, which comprises a plurality of ridges or tops that are mutually separated by grooves, the pitch between the ridges being given, wherein the connecting surface is formed so that the widths of two or more grooves positioned one after the other in a series increase progressively from a first groove to a last groove in the series, without the given pitch between the ridges being changed, and wherein the ridges and grooves are straight and parallel, and wherein the depth of said two or more grooves is the same.

* * * * *